United States Patent [19]
Yang

[11] Patent Number: 5,719,599
[45] Date of Patent: Feb. 17, 1998

[54] METHOD AND APPARATUS FOR EFFICIENT DIGITAL MODELING AND TEXTURE MAPPING

[75] Inventor: Steven Yang, Fremont, Calif.

[73] Assignee: Seiko Epson Corporation, Tokyo, Japan

[21] Appl. No.: 475,872

[22] Filed: Jun. 7, 1995

[51] Int. Cl.[6] .................. G06T 7/40; G06T 15/50
[52] U.S. Cl. ........................................ 345/430
[58] Field of Search .................. 395/119, 123, 395/130

[56] References Cited

U.S. PATENT DOCUMENTS

| | | | |
|---|---|---|---|
| 5,469,535 | 11/1995 | Jarvis et al. | 395/130 |
| 5,490,240 | 2/1996 | Foran et al. | 395/130 |
| 5,537,638 | 7/1996 | Morita et al. | 395/130 |

FOREIGN PATENT DOCUMENTS

| | | |
|---|---|---|
| 0637 818 | 2/1995 | European Pat. Off. . |
| 0 656 609 | 6/1995 | European Pat. Off. . |

OTHER PUBLICATIONS

IEEE Computer Graphics And Applications, Nov. 1986, USA, vol. 6, No. 11, New York, NY, USA ISSN 0272-1716, pp. 56–67; XP 000002233 "Survey of Texture Mapping".

Computers & Graphics, 1984; vol. 8, No. 2, ISSN 0097-8493, pp. 115–123, XP000579660, M. Gangnet et al; "Perspective Mapping Of Planar Textures".

George Wolberg, "Digital Image Warping" IEEE Computer Society Press, Los Alamitos, California; XP2,012,021; pp. 187–199.

*Primary Examiner*—Phu K. Nguyen
*Assistant Examiner*—Cliff N. Vo
*Attorney, Agent, or Firm*—Mark P. Watson

[57] ABSTRACT

Methods and apparatus for mapping texture, which may encode three-dimensional elements, from a first raster of pixels (e.g., a texture map) to a second raster of pixels (e.g., a displayable frame buffer or other target map). The pixels of the first raster include a recession component q and the pixels of the second raster include a recession component w. Successive pixels of the target map are mapped to corresponding pixels of the texture map, linearly interpolated to account for recession, and assigned values consistent with the interpolation. Unlike prior systems, which are designed to scan pixels along horizontal rows or vertical columns, the invention scans along lines where the quantity q/w is constant. These scan lines are generally parallel to one another, obviating the need for repeated slope computations; they also tend to correspond to similar levels of detail in prefiltered (e.g., mip map) texture representations, obviating the need for shifting among representations.

24 Claims, 5 Drawing Sheets

METHOD AND APPARATUS FOR EFFICIENT DIGITAL MODELING AND TEXTURE MAPPING

FIELD OF THE INVENTION

This invention relates to digital image generation and manipulation, and in particular to an improved technique for mapping output information from one digitized image to another.

BACKGROUND OF THE INVENTION

The widespread availability of powerful computer equipment has drastically expanded the amount of image detail and spatial information that can be represented in digital form. Whereas in older systems images were stored as "bitmap" rasters of bilevel values, modern image generation and manipulation systems accommodate multilevel "pixmaps" in which each image picture element, or "pixel," is represented by one or more bytes that can specify entries from huge color palettes, luminance values, etc.

In sophisticated systems, digitally represented images can originate from an optical scanner or the user's interactions with a high-level application program that facilitates computer design and rendering. The resulting pixel data is organized in an "imagewise" array, or raster, that collectively represents the image. The two-dimensional raster geometry corresponds to the displayable width and height of the image, while the number of bits associated with each pixel in the array is called the depth. The raster is stored in a computer memory partition called the "frame buffer," the contents of which determine the instantaneous displayed image on an output device.

Among the most computationally demanding tasks involving digitized images are spatial transformations among images or image components in a manner that reflects three-dimensional relationships. For example, if the design program permits a user to rotate a sphere in three dimensions, the program must maintain computational "awareness" of the entire surface content of the sphere even though only a portion of that content is visually presented at any one time. Perspective issues also arise, since three-dimensional manipulation affects not only the absolute content that is presented to the user but its rendered perspective as well; these are quite visible for edged graphic objects, such as cubes and tilted planes. Manipulation of the content so that the visible image portions make sense given the user's viewpoint requires application of mathematically intensive geometric transformations to each pixel of such objects.

The most advanced design systems give the user control over the surface appearance of three-dimensional objects, altering the values of pixels corresponding to object surfaces so they conform to user selections. For example, design systems can allow users to add visual detail to otherwise simple surfaces (or to replace existing surface detail with new designs or images) using a technique known as "texture mapping." In this context the term "texture" broadly connotes any form of surface detail, such as an image, and not merely simple surface patterns. Employing this technique, the user specifies a digitally sampled "picture," represented as a pixmap and known as a "texture map" or "texture" to be applied to the designated surface(s), or "target map," of a three-dimensionally rendered object. The imaging system applies the pixels, or "texels" of the texture map to the target map using successive spatial transformations: it first applies the texture to a mathematical representation of the object as it would appear in three-dimensional space, and then projects the visible surfaces of the object onto a pixmap representing the output screen.

These spatial transformations are carried out not on lattice-like pixmaps, which contain gaps between discrete pixel locations, but on continuous planes. Were one to transform pixmaps, the result would be holes, or patches of undefined pixels, when mapping contiguous source pixels to sparse positions on the target grid, and overlaps when consecutive source pixels collapse into one target pixel as a result of the transformation. For this reason, continuous planes corresponding to source and target pixmaps are defined, with pixels considered to correspond to contiguous square patches of the planes. This allows the target plane to remain contiguous following mapping, at which time only those pixels corresponding to patches that have survived the transformation are rendered.

This procedure is illustrated for a very simple case in FIGS. 1A–1D. We wish to map the texture (e.g., a pattern or another image) represented by the rectangle in u,v texture space (FIG. 1D) onto the triangle within the cylinder shown in FIGS. 1A and 1C. If the cylinder were a true object existing in three-dimensional space, as depicted in FIG. 1A, it would extend over the three spatial dimensions x,y,z. However, the viewer of this object represented on a video display sees only a two-dimensional window normal to the viewer's line of sight, and defined by an array of pixels as shown in FIG. 1C; pixels corresponding to portions of the original object that lie behind the x,y window plane are appropriately shaded or otherwise modified to convey the illusion of three-dimensionality. Simply copying portions of the texture map coextensive with the two-dimensional representation of the triangle into the triangle would result in distortion, since perspective would be ignored: the triangle is a curved object while the texture map is flat. The true spatial extent of the triangle is shown in FIG. 1B; in order to present the two-dimensional appearance of an equilateral triangle on a curved surface, as in FIG. 1 A, the original triangle must itself be somewhat distorted. The two-dimensional projection of this distorted object is smaller than the true object, and simply applying such a projection to the texture map would therefore fail to cover all relevant pixels.

To be geometrically consistent, one might first "unwrap" the triangle and apply the distorted but flattened object shown in FIG. 1 B to the texture map shown in FIG. 1D; that way, one would be assured of covering all relevant pixels of the texture map. Equivalently, one could transform the texture map into a cylinder having a curvature matching that of the cylinder in FIG. 1A, and apply the texture-map pixels directly to the cylinder. Then, in the two-dimensional projection of the three-dimensional object, one would modify any pixels lying behind the x,y plane to account for distance and, typically, distortion due to perspective. For example, pixels that are farther away from the viewer might be darkened to reflect distance, while the image data encoded by receding pixels is compressed to reflect perspective convergence. Compression naturally results in loss of image information, since not all source pixels will be represented in the adjusted image; the proper values of output pixels are therefore derived from the source pixels by linear interpolation thereamong.

This process can be implemented efficiently by encoding recession as a pixel data component. Each pixel is then defined not only by color data and an x,y location in the viewing window, but also by a weighting factor w that reflects the degree of recession, taking perspective into account, behind the x,y plane. Thus, the weighting factor w encodes a perspective transformation along the -z axis, operating on a two-dimensional array of pixels to convey the illusion of three-dimensionality; dividing a pixel value by its weighting factor modifies the pixel values in a manner consistent with perspective and distance behind the x,y plane (where w is defined as 1). For purposes of encoding, it is useful to represent pixels using x',y' coordinates, where x'=x/w, y'=y/w as shown in FIG. 1C. Linear interpolation among pixels is accomplished using x',y' values instead of the original source values.

Matters become somewhat more complex when the texture map also involves some degree of perspective recession (i.e., where objects represented in the texture do not lie exclusively in the u,v plane). In that case, the texels are deemed to encode a texture surface having axes s,t; and the u,v values are considered to reflect projection of the texture surface onto the u,v plane. This is accomplished by division of the s,t values by a weighting factor q that encodes perspective recession of the texture surface.

To apply texture to a target map, the target map is divided into a series of triangles or quadrilaterals that are mapped to corresponding regions within the texture map. The mapping reflects perspective recession in the texture map, and texels within the applied triangles or quadrilaterals are successively scanned, horizontal line by line, to determine their values for introduction into the target map. Because mapping back into the target map must take account of the perspective distortion in that map also, texels must ordinarily be combined, through linear interpolation, in receding regions; that is, because of perspective, the values of multiple texels will be combined into a single target pixel. Depending on the degree of recession, the number of texels mapped to a single target pixel may be quite large; in these instances it may prove computationally advantageous to combine pixels from a coarser version of the texture map, since the difference in ultimate output resolution is likely to be unnoticeable. Successively coarser versions of texture maps may be encoded as so-called "mip maps," with a "level of detail" factor d specifying which mip map to utilize for particular regions of texels depending on the degree of compression.

Linear interpolation is most easily accomplished utilizing u,v (i.e., s/q, t/q and d) values directly; that is, by identifying the texels corresponding to a single target pixel, then linearly interpolating among the various u,v values to obtain a final value to be copied into the target pixel. This assumes, however, that u,v coordinates map linearly into the x',y' window plane—a condition that in fact occurs only if w=q, or if q or w is equal to 1. Linearly interpolating u,v values where w≠q≠1 results in poor image quality, since the perspectives associated with the target and texture maps will be confused.

A better approach to linear interpolation operates on s,t values rather than u,v values, dividing s, t and q by w to account for the perspective distortion in the target map; interpolating; and then dividing the result by q/w to apply to results of interpolation to the original u,v values. In this way, texels are scanned along the flat s,t plane that is undistorted by perspective, and the perspectives associated with both the texture and target maps are introduced after linear interpolation is complete. Thus, interpolation is performed among the values $$s'=s/w, \ t'=t/w, \ q'=q/w$$

and the interpolated values s', t' and q' are divided by q' to obtain interpolated u,v values. For example:

$$\frac{(s/w)}{(q/w)} = s/q = u$$

While this approach yields excellent image quality, it is computationally demanding. The need to perform two division operations on each texel as it is scanned requires multi-cycle functions that slow system performance, and make this approach all but impractical on low-end equipment.

DESCRIPTION OF THE INVENTION

SUMMARY OF THE INVENTION

The present invention simplifies the process of introducing a texture map into a target map by avoiding the need for division of each texel by q/w following linear interpolation. The invention accomplishes this by scanning the target map not along horizontal lines, as is commonly done, but along lines where the quantity q/w is constant. In this way, after interpolation each texel can be multiplied by this constant value, obviating the need for two division operations: first to obtain q/w for each pixel (since this operation need only be performed once), and then to divide s/w and t/w by this quantity in order to recover the u,v values (since s/w and t/w can instead be multiplied by the constant value w/q, multiplication representing a computationally less demanding operation than division).

In a first aspect, the invention comprises a method for mapping from a raster encoding a texture, which may reflect three-dimensional elements, to a target raster that may also represent a two-dimensional projection of a three-dimensional image. In the preferred implementation of this method, successive pixels of the target map are mapped to corresponding pixels of the texture map, linearly interpolated to account for recession of the surfaces encoded by the texture and target maps, and assigned values consistent with the interpolation. Unlike prior systems, which are designed to scan pixels along horizontal rows or vertical columns, the present invention scans along lines where the quantity q/w is constant. Alternatively, pixels can be "forward mapped" from the texture map into the target map along similarly defined scan lines. It has been found that these scan lines are generally parallel to one another, obviating the need for repeated slope computations; they also tend to correspond to similar levels of detail in prefiltered (e.g., mip map) texture representations, obviating the need for shifting among representations.

In a second aspect, the invention comprises an apparatus for implementing the foregoing method. The apparatus includes a processor, buffers for locally storing a target map and at least one texture map, a display for viewing the target map, and software for operating the processor to execute the operations described above. Alternatively, responsibility for these pixel operations can be assumed by, or shared with, dedicated hardware.

BRIEF DESCRIPTION OF THE DRAWINGS

The foregoing discussion will be understood more readily from the following detailed description of the invention, when taken in conjunction with the accompanying drawings, in which.

DESCRIPTION OF THE PREFERRED EMBODIMENTS

Figure 2:
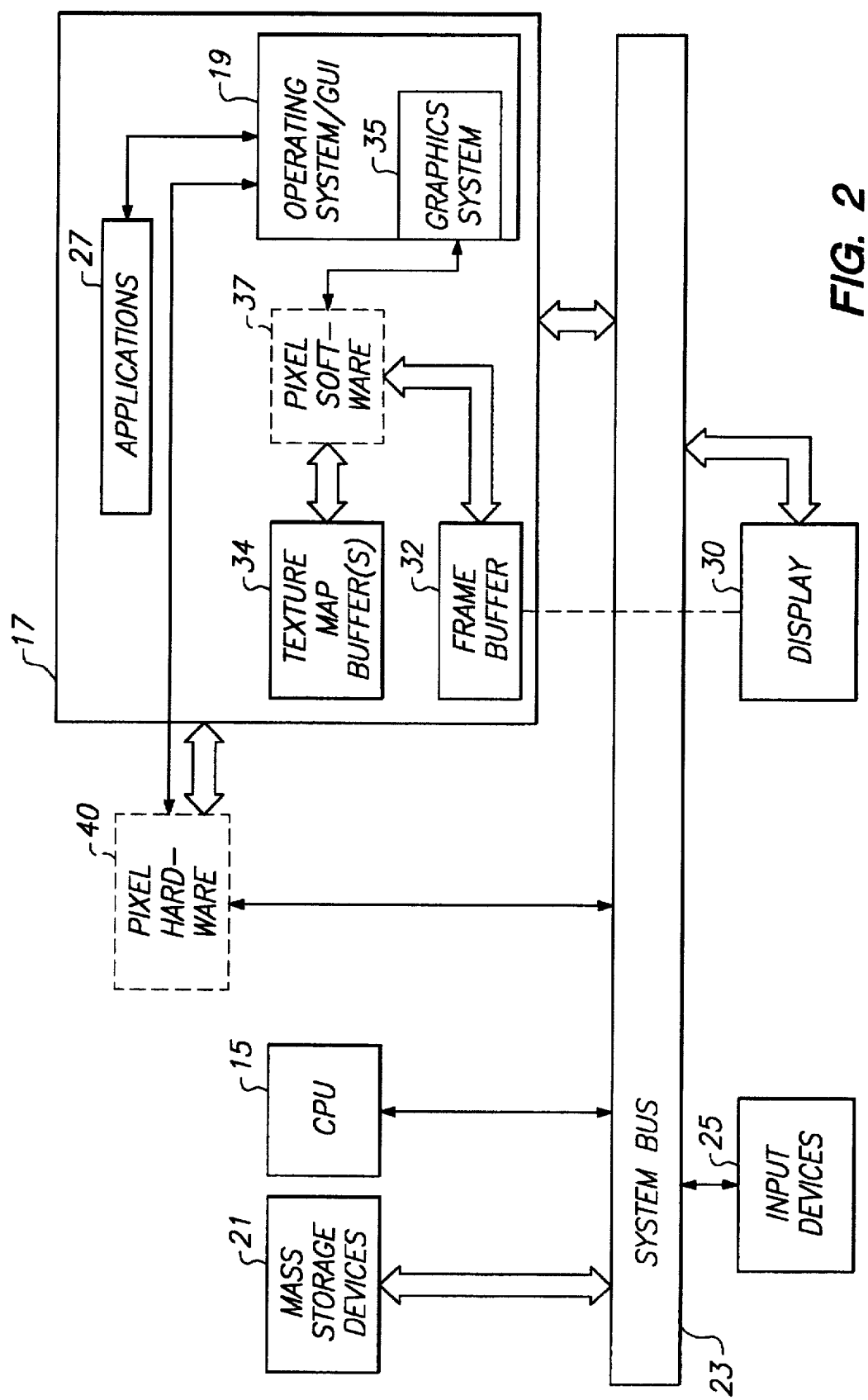
FIG. 2 schematically illustrates a representative computational environment for the present invention.

Refer to FIG. 2, which illustrates a generalized hardware environment for graphic and image-rendering applications using texture mapping. The depicted computer system includes a host central-processing unit (CPU) 15, which performs operations on and interacts with a main system memory 17 and components thereof. System memory 17 typically includes volatile or random-access memory (RAM) for temporary storage of information, including portions of the computer's basic operating system and graphical user interface (denoted collectively by reference numeral 19). The system typically also includes read-only memory (ROM) for permanent storage of the computer's configuration and additional portions of the basic operating system, and at least one mass storage device 21, such as a hard disk and/or CD-ROM drive. All components of the system communicate over a bidirectional system bus 23.

The user ordinarily interacts with the system by means of one or more input devices 25 (e.g., a keyboard, mouse, an optical scanner that reads documents and digitizes their contents, etc.) as it runs one or more application programs 27, at least portions of which reside in system memory 17. As used herein, the term "application program" refers broadly to any body of functionality for processing information of interest to the user and presenting that information in a manner that involves digital modeling or texture-mapping operations. Output is presented on a display 30. The instantaneous, pixel-by-pixel appearance of display 30 is determined by the contents of a frame buffer 32, which is shown as a partition of main system memory 17 (although it may be implemented separately from memory 17). Frame buffer 32 or a portion thereof represents the target map for purposes of texture mapping. Another buffer or series of buffers 34 contains texels corresponding to at least one texture map or portion thereof; the remainder of a particular texture map, or filtered representations thereof (e.g., mip maps) may be stored on a mass storage device 21 or in buffer(s) 34.

A suitable system typically includes a number of components dedicated to graphic or image-rendering operations. Operating system 19 includes a graphics subsystem 35 that executes basic pre-rendering functions not directly germane to the present invention, such as decomposing an input image into graphics primitives such as image points, lines and polygons and interpretation of encoded graphics instructions (e.g., PostScript™ commands); this functionality can also be shared with applications 27.

The present invention is implemented by software and, in more sophisticated systems, hardware that executes more advanced imaging functions. For example, a pixel-processing module 37 may perform operations that mathematically relate the target map to the texture map and introduce pixels from the latter to the former. Module 37 would also typically perform linear interpolation among the texels, assign target pixel attributes such as color, transparency (so that overlapping objects properly occlude one another) and object connectivity, and possibly perform lighting calculations. In high-end systems, responsibility for virtually all graphics and image-rendering operations not performed by graphics system 35 is lodged in dedicated hardware, representatively denoted at reference numeral 40. This display-control hardware, which may consist of one or several discrete integrated-circuit processors, is operatively connected directly to frame buffer 32 and possibly buffer(s) 34 as well; thus, in these systems read and write operations between hardware 40 and frame buffer 32 occur without involvement of bus 23. The pixel functions of importance to the present invention relate to mapping, scanning, interpolation and blending. Therefore, for clarity of presentation, the ensuing discussion will collectively refer to software 37 and hardware 40 as a generic "pixel processor," it being understood that the necessary functionality can be implemented in software, hardware or some combination thereof in accord with routine design choice.

During operation of the present invention, texels are brought from a texture map into a target map in a manner that avoids disruption of the perspective relationships encoded in each map. Efficient methods of general applicability for performing the necessary pixel-by-pixel transformations are well-characterized in the art, and are known broadly as "scanline" techniques. These techniques operate directly on rows or columns of pixels, mapping, for example, each member of a row or column of target-map pixels to one or more texels or vice versa. As noted earlier, although pixels in fact represent spatially discrete, point-like regions of display 30, they are considered, for purposes of scanning, to correspond to contiguous square patches.

Preferably, texture mapping is carried out in an "inverse" fashion as indicated above, where each target-map pixel is mapped onto the texture map. More specifically, the four corners of each target-map pixel are mapped to corresponding points on the surface s,t of the object represented in the texture map; the mapping reflects a spatial transformation relating the orientation of the three-dimensional surface projected onto the target map to the orientation of the texture surface projected onto the texture map. Then the pixel's corner points in the surface's coordinate space s,t are mapped into the u,v space of the texture map. The resulting four points in u,v space define a quadrilateral that approximates the more complex shape into which the pixel may actually map due to curvature of the three-dimensional surfaces. A value for the target-map pixel is computed by linear interpolation—that is, summing all texels lying at least in part within the quadrilateral, and weighting each by the fraction of the texel actually inside the quadrilateral boundary.

Figure 1A:
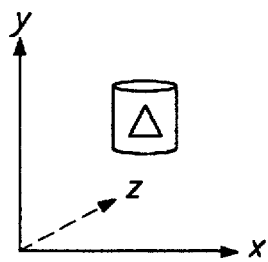
FIG. 1A–1D, discussed above, schematically depict the various operations involved in texture mapping.
Figure 1B:
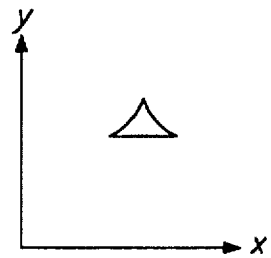
Figure 1C:
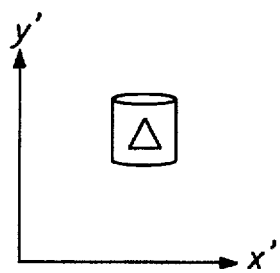
Figure 1D:
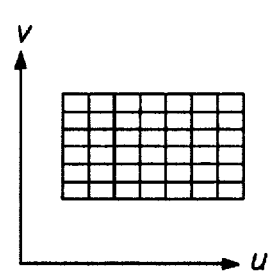
Figure 3A:
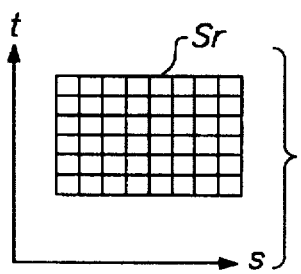
FIGS. 3A–3C schematically depict the mapping sequences performed by the present invention.
Figure 3B:
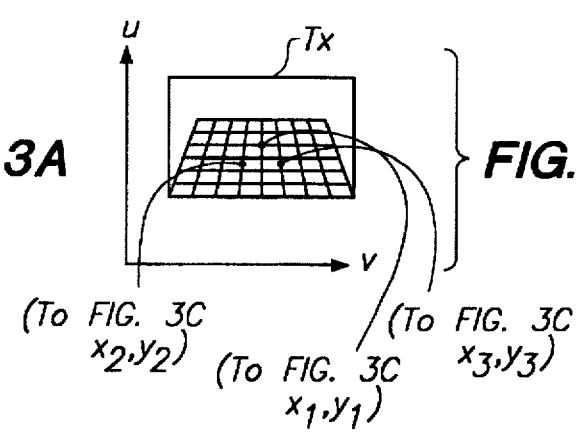
Figure 3C:
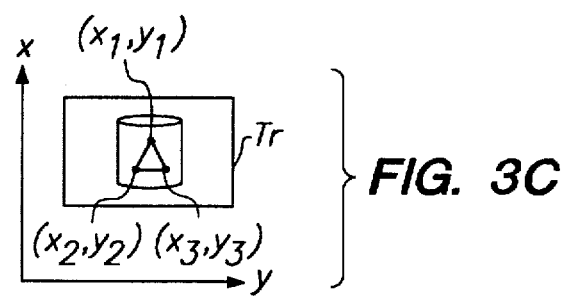

The process is illustrated in FIGS. 3A–3C, which utilizes the exemplary patterns shown in FIGS. 1A–1D. FIG. 3A illustrates the texture surface Sr: a simple grid pattern lying in the s,t plane. The surface Sr is represented as a receding pattern, however, in the actual texture map Tx, which is defined by the plane u,v in FIG. 3B; in other words, the planar surface Sr is tilted with respect to texture map Tx and the u,v plane onto which it is projected. This recession is encoded by a value q associated with each u,v pixel.

Similarly, as shown in FIG. 3C, the cylindrical surface recedes behind the plane of the target map Tr, and this recession is encoded by a w value associated with each x', y' target-map pixel. Thus, the hypothetical cylinder itself lies in x,y,z space, and the quantity w encodes depth along the z axis.

In this example, texture is to be applied to a primitive element in the target map Tr. The target map typically resides in frame buffer 32, and is seen by the user. Ordinarily, the region to which texture is applied consists of many such elements that are scanned successively; for ease of presentation, however, the primitive element—a triangle—also represents the entire region to be filled with the texture.

Figure 4:
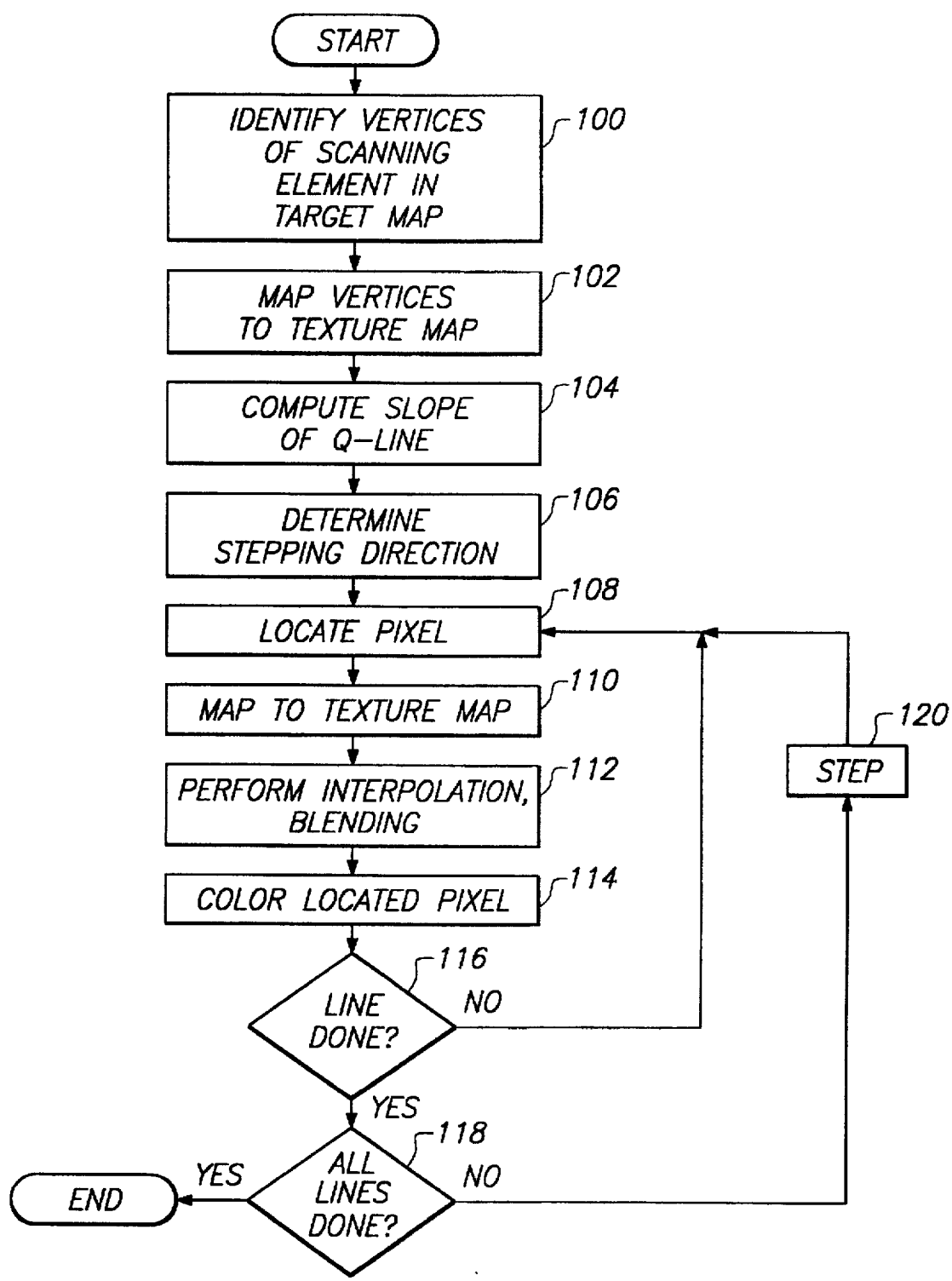
FIG. 4 is a flow chart illustrating the overall operation of the present invention.

Operation of the invention is set forth in FIG. 4. In a first step 100, the vertices of the triangle to be filled with texture are located, and in step 102 are mapped to surface Sr and then to the texture map Tx. (Conceptually, points from the three-dimensional cylinder are mapped to the surface Sr, resulting, as shown in FIG. 3B, in a foreshortening of the original triangle due to recession of the cylinder and surface Sr; in practice, this is accomplished utilizing values from the two-dimensional rasters of pixels that encode recession as described above.) Due to recession of the surface Sr, each pixel of the triangle (as projected onto target map Tr) covers more than one pixel of the surface; in addition, because the triangle represents a receding curved surface, each of its pixels corresponds to more than texel of texture map Tx.

In step 104, the slope of "Q-line," along which the quantity q/w is constant and which will determine the direction of scanning, is obtained as follows. The plane equation for the target map is $$Ax+By+C=0$$

Because q/w is linear with respect to x and y, $$q/w = Ax + By + q_o/w_o$$

Therefore, it is possible to solve the plane equation using three points in the target map. Choosing those points as the three vertices $x_1,y_1,x_2,y_2,x_3,y_3$ of the triangle to be mapped to surface Sr, $$Ax_1+By_1+q_1/w_1+C=0$$

$$Ax_2+By_2+q_2/w_2+C=0$$

$$Ax_3+By_3+q_3/w_3+C=0$$

Because q,w values are known for each x,y point, the foregoing equations facilitate solution of the unknowns A, B, C. To identify the line of constant q/w, the quantity $q_1/w_1$ is computed at the beginning of a scanline. Then the line $$Ax+By+G=0$$

where $$G=q_1/w_1+C$$

defines the Q-line where $q/w=q_1/w_1$ (the variables A, B and C having been derived as set forth above). Accordingly, rather than proceeding along a row or a column, as in traditional scan-line processing, the invention scans target-map pixels along the Q-line. The quantities s/w and t/w are interpolated along this line, and the resulting values multiplied by w/q to recover u,v texture map values. As a result, it is necessary to perform only one division per scan line to obtain the constant w/q, followed by multiplication by this quantity at each point to obtain s/q and t/q.

Moreover, the Q-lines will be parallel to one another with constant slope B/A. It is therefore unnecessary to recompute the slope at each scanline.

Figure 5:
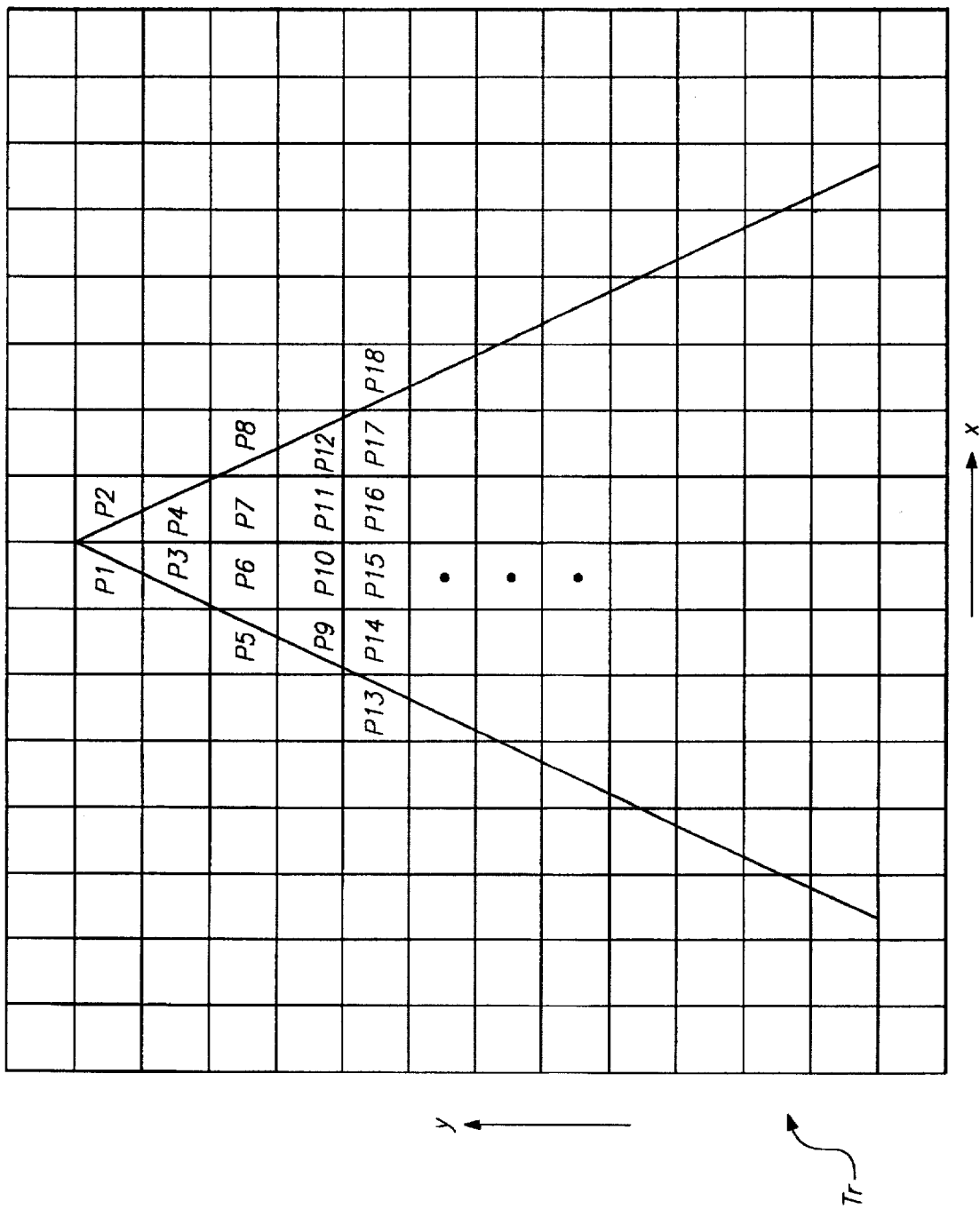
FIG. 5 depicts a portion of the target map containing the region to be filled with texture.
Figure 6:
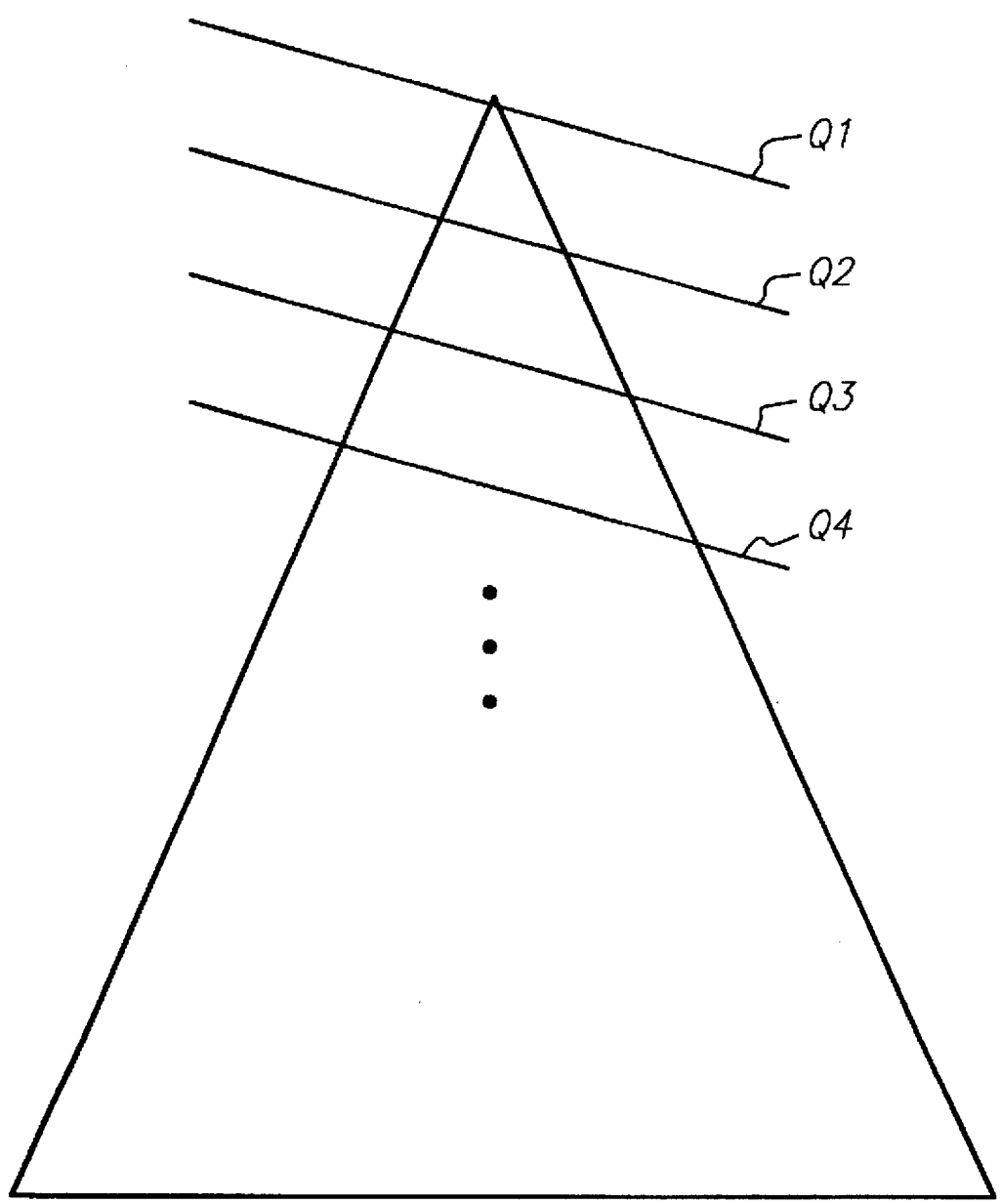
FIG. 6 illustrates the manner in which that region is scanned, pixel-by-pixel, in accordance with the present invention.

These operations are illustrated in greater detail in FIGS. 5 and 6. In FIG. 5, the triangle shown in FIG. 3C is represented in terms of its constituent pixels in the target map. Ordinarily, scanning proceeds horizontally along spans of sequential pixels intersecting or within the triangle outline; after each span is scanned, the pixel processor "steps" vertically down to the next span. Thus, the pixel processor would scan pixels P1 and P2, followed by P3 and P4, then P5 through P8, etc. In the present invention, by contrast, the proper direction of stepping depends on the slope of the Q-line. A series of representative Q-lines Q1, Q2, Q3, Q4 is shown in FIG. 6. After locating the line Q1 and determining its proper slope, it is necessary only to step by a distance equal to one pixel width in order to locate the next Q-line.

Therefore, in step 106, the pixel processor determines the major axis of the Q-line. If the major axis lies along the y-axis—that is, if the absolute value of the slope of the Q-line exceeds 1—then scanning proceeds largely vertically, and so the pixel processor steps horizontally (along the minor axis of the Q-line). If, on the other hand, the absolute value of the slope of the Q-line is less then 1, the pixel processor steps vertically. In other words, stepping is horizontal for Q-lines within ±45° of the x-axis, and vertical for all other Q-lines. The Q-lines shown in FIG. 6, for example, have slopes whose absolute values are less than 1, and so stepping is vertical.

In step 108, a pixel is located along the Q-line, beginning with the pixel intersected by the triangle edge; for the first Q-line Q1, which intersects the triangle vertex, that pixel is P2, the only pixel scanned along line Q1. The four corners of pixel P2 are mapped to the texture map Tx in step 110, and in step 112 linear interpolation among the covered texels is performed. The s,t,q values of the covered texels are divided by w to account for perspective distortion in target map Tr (due to the fact that the triangle being scanned lies on a curved cylinder) and interpolation is performed on the texel values s'=s/w, t'=t/w, q'=q/w. The quantity q', of course, has already been computed. Following interpolation, the result is multiplied by w/q to recover the u,v values of the interpolated texels. In effect, interpolation with s',t',q' values is performed to obtain relative weights, which are applied to the true u,v texels.

As noted above, virtually all target-map pixels will be derived from a plurality of texels, so that the process of weighting and summing among texels will be repeated for each scanned pixel. In general, the number of texels corresponding to a particular pixel depends on the geometric relationship between the texture map and the three-dimensional object surface. In extreme cases, such as where a texture is applied to an oblique, receding ground plane in the target map, the process can become quite inefficient as extremely large numbers of texels must be weighted and summed just to texture a single distant ground-plane pixel. To overcome such problems, various prefiltering schemes have been devised. These typically involve representing the texture map as a multi-resolution data structure, and may be generated by successively bandlimiting and subsampling the original texture map to form a hierarchy of images at decreasing resolutions. The coarser texture maps are computationally less demanding to use since they are prefiltered, and the pixel processor determines which texels in which texture maps to apply to a given surface point based on appropriate geometric considerations; the overall goal is to maximize processing efficiency with minimal sacrifice to final image resolution. Typically, an application program 27 specifies the relative weights accorded these competing parameters. Mip maps constitute a widespread pre-filtering approach.

The actual pixel-defining quantities that are interpolated depends on the type of system. Typically these include color, e.g., color values in a red/blue/green color space, and may also include a transparency or pixelcoverage value α and/or a fog value F. In step 114, the interpolated values of these quantities are copied into the scanned pixel. It has been found that, in the context of mip maps, the level of detail factor d is approximately constant along a Q-line. Accordingly, it is usually unnecessary to recompute this quantity for each scanned pixel.

Steps 104-114 are repeated until scanning along the Q-line brings the pixel processor to an edge pixel, as indicated at step 116. Techniques of edge-line definition and for confining scanning within edge lines are wellknown in the art. After a Q-line has been completely scanned within edges of the element to be filled with texture, a new Q-line is defined unless the element has been completely filled (step 118). The pixel processor steps in the appropriate direction at step 120, defining a new Q-line with the previously computed slope. In other words, the pixel processor simply steps one pixel width along the minor axis of the Q-line to define a new Q-line with the same slope, which is scanned in accordance steps 108-114. As indicated above, the process continues until each pixel in the element to be filled has been scanned.

It will therefore be seen that the foregoing represents a highly advantageous and efficient approach to texture mapping. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of mapping texture from a first raster of pixels to a second raster of pixels, the pixels of the first raster having values including a recession component q and the pixels of the second raster having values including a recession component w, the pixels of the first raster corresponding to pixels of the second raster according to a mapping relationship, the method comprising:
   a. identifying a region of pixels in the second raster;
   b. locating pixels within the region along lines passing through pixels in the second raster that correspond to pixels in the first raster such that the quantity q/w is constant; and
   c. mapping pixels from the first raster to the located pixels in the second raster.

2. The method of claim 1 wherein the pixels mapped from the first raster correspond to the located pixels according to the mapping relationship, at least some of the located pixels each corresponding to a plurality of first-raster pixels, and further wherein the mapping step comprises:
   a. for each located pixel corresponding to a plurality of first-raster pixels, linearly interpolating among the values of the corresponding first-raster pixels to obtain an interpolation value; and
   b. assigning the interpolation value to the located pixel.

3. The method of claim 2 wherein the step of linearly interpolating comprises:
   a. dividing the value of each corresponding first-raster pixel by w;
   b. linearly interpolating among the thus-divided first-raster pixel values to obtain an interpolation value; and
   c. multiplying the interpolation value by w/q.

4. The method of claim 1 wherein the lines are parallel to one another.

5. The method of claim 1 further comprising the steps of:
   a. providing a plurality of prefiltered texture maps each representing a different level of detail;
   b. selecting one of the texture maps;
   c. introducing the texture map into the first raster; and
   d. mapping pixels from the selected texture map to the located pixels in the second raster.

6. A method of mapping texture from a first raster of pixels to a second raster of pixels, each pixel being represented as a square having a side length, the pixels of the first raster having values including a recession component q and the pixels of the second raster having values including a recession component w, and the pixels of the first raster corresponding to pixels of the second raster according to a mapping relationship, the method comprising:
   a. identifying a region of pixels in the second raster, the region being bounded by a plurality of edges;
   b. locating pixels along a first line having a slope along which the quantity q/w is constant and intersecting first and second edges of the region, the located pixels lying within or on the first and second edges;
   c. mapping pixels from the first raster to the located pixels in the second raster;
   d. locating pixels along a new line having a slope along which the quantity q/w is constant and intersecting the first and second edges, the new line being displaced from the previous line along at least one of the first and second edges by a distance equal to the side length, the located pixels lying within or on the first and second edges;
   e. mapping pixels from the first raster to the located pixels in the second raster; and
   f. repeating steps (d) and (e) until all pixels lying within or on an edge of the region have been located.

7. The method of claim 6 wherein the pixels mapped from the first raster correspond to the located pixels according to the mapping relationship, at least some of the located pixels each corresponding to a plurality of first-raster pixels, and further wherein each mapping step comprises:
   a. for each located pixel corresponding to a plurality of first-raster pixels, linearly interpolating among the values of the corresponding first-raster pixels to obtain an interpolation value; and
   b. assigning the interpolation value to the located pixel.

8. The method of claim 7 wherein the step of linearly interpolating comprises:
   a. dividing the value of each corresponding first-raster pixel by w;
   b. linearly interpolating among the thus-divided first-raster pixel values to obtain an interpolation value; and
   c. multiplying the interpolation value by w/q.

9. Apparatus for mapping texture from a first raster of pixels to a second raster of pixels, the apparatus comprising:
   a. a first computer memory for storing data defining the first raster of pixels, the data encoding pixel values including a recession component q;
   b. a second computer memory for storing data defining the second raster of pixels, the data encoding pixel values including a recession component w;
   c. means for encoding a mapping relationship between the rasters such that the pixels of the first raster correspond to pixels of the second raster according to the mapping relationship; and d. pixel-processing means for:
   i. identifying a region of pixels in the second raster;
   ii. locating pixels within the region along lines passing through pixels in the second raster that correspond to pixels in the first raster such that the quantity $q/w$ is constant; and
   iii. mapping pixel values from the first raster to the located pixels in the second raster.

10. The apparatus of claim 9 wherein:
   a. the pixels mapped from the first raster correspond to the located pixels according to the mapping relationship, at least some of the located pixels each corresponding to a plurality of first-raster pixels;
   b. the pixel-processing means is further configured to linearly interpolate, for each located pixel corresponding to a plurality of first-raster pixels, among the values of the corresponding first-raster pixels to obtain an interpolation value, and to thereafter assign the interpolation value to the located pixel.

11. The apparatus of claim 10 wherein the pixel-processing means linearly interpolates by:
   a. dividing the value of each corresponding first-raster pixel by $w$;
   b. linearly interpolating among the thus-divided first-raster pixel values to obtain an interpolation value; and
   c. multiplying the interpolation value by $w/q$.

12. The apparatus of claim 10 further comprising a third computer memory for storing a plurality of prefiltered texture maps each representing a different level of detail, the pixel-processing means being further configured to:
   a. select one of the texture maps;
   b. introduce data defining the texture map into the first raster; and
   c. map pixel values from the selected texture map to the located pixels in the second raster.

13. The apparatus of claim 10 wherein each raster encodes a surface, each pixel corresponding to a square area of the surface having a side length and further wherein the region of pixels comprises a plurality of edges, the pixel-processing means being configured to locate pixels along a plurality of lines, each line having a slope along which the quantity $q/w$ is constant and intersecting first and second edges of the region, the located pixels lying within or on the first and second edges.

14. The apparatus of claim 10 wherein each line is displaced from at least one other line along at least one of the first and second edges by a distance equal to the side length.

15. Apparatus for mapping texture from a first raster of pixels to a second raster of pixels, the apparatus comprising:
   a. a central processing unit (CPU);
   b. a system memory including stored instructions for operating the CPU;
   c. a frame buffer for storing a pixmap defining the second raster of pixels and comprising displayable pixel data, the data encoding pixel values including a recession component $w$;
   d. a texture-map buffer for storing a pixmap defining the first raster of pixels and comprising displayable pixel data, the data encoding pixel values including a recession component $q$, the frame-buffer pixmap and the texture-map pixmap being related to one another according to a mapping relationship; and
   e. a pixel processor, operatively connected to the frame buffer and the texture-map buffer, for:
      i. identifying a region of pixels in the frame buffer;
      ii. locating pixels within the region along lines passing through pixels in the frame buffer that correspond to pixels in the texture-map buffer such that the quantity $q/w$ is constant; and
      iii. mapping pixel values from the first raster to the located pixels in the second raster according to the mapping relationship.

16. The apparatus of claim 15 further comprising:
   a. a system memory containing executable instructions;
   b. a bus for facilitating data exchange between the CPU and the system memory, wherein
   c. the pixel processor comprises instructions executable by the CPU and stored in the system memory, the CPU operating in accordance with the instructions fetched from the system memory over the bus.

17. The apparatus of claim 15 wherein the pixel processor comprises a discrete processor separate from the CPU.

18. The apparatus of claim 15 further comprising a display having visual contents and operatively coupled to the frame buffer, the visual contents of the display being determined by the data stored in the frame buffer.

19. A computer system comprising:
   a. a display having display contents; and
   b. means for mapping texture to the display, said means comprising:
      i. a first computer memory for storing data defining a first raster of pixels, the data encoding pixel values including a recession component $q$ and defining a texture;
      ii. a second computer memory for storing data defining a second raster of pixels, the data encoding pixel values including a recession component $w$ and determining the display contents;
      iii. means for encoding a mapping relationship between the rasters such that the pixels of the first raster correspond to pixels of the second raster according to the mapping relationship; and
      iv. pixel-processing means for (a) identifying a region of pixels in the second raster, (b) locating pixels within the region along lines passing through pixels in the second raster that correspond to pixels in the first raster such that the quantity $q/w$ is constant, and (c) mapping pixel values from the first raster to the located pixels in the second raster.

20. The system of claim 19 wherein the pixel-processing means linearly interpolates by:
   a. dividing the value of each corresponding first-raster pixel by $w$;
   b. linearly interpolating among the thus-divided first-raster pixel values to obtain an interpolation value; and
   c. multiplying the interpolation value by $w/q$.

21. The system of claim 19 further comprising a third computer memory for storing a plurality of prefiltered texture maps each representing a different level of detail, the pixel-processing means being further configured to:
   a. select one of the texture maps;
   b. introduce data defining the texture map into the first raster; and
   c. map pixel values from the selected texture map to the located pixels in the second raster.

22. The system of claim 19 wherein each raster encodes a surface, each pixel corresponding to a square area of the surface having a side length and further wherein the region of pixels comprises a plurality of edges, the pixel-processing means being configured to locate pixels along a plurality of lines, each line having a slope along which the quantity $q/w$ is constant and intersecting first and second edges of the region, the located pixels lying within or on the first and second edges.

23. The system of claim 19 wherein each line is displaced from at least one other line along at least one of the first and second edges by a distance equal to the side length.

24. The system of claim 19 wherein:

a. the pixels mapped from the first raster correspond to the located pixels according to the mapping relationship, at least some of the located pixels each corresponding to a plurality of first-raster pixels;

b. the pixel-processing means is further configured to linearly interpolate, for each located pixel corresponding to a plurality of first-raster pixels, among the values of the corresponding first-raster pixels to obtain an interpolation value, and to thereafter assign the interpolation value to the located pixel.

* * * * *

UNITED STATES PATENT AND TRADEMARK OFFICE
CERTIFICATE OF CORRECTION

PATENT NO. : 5,719,599
DATED : February 17, 1998
INVENTOR(S) : Steven Yang

It is certified that error appears in the above-identified patent and that said Letters Patent is hereby corrected as shown below:

Column 12, line 45, change "claim 19" to --claim 24--.

Signed and Sealed this

Ninth Day of June, 1998

Attest:

BRUCE LEHMAN

Attesting Officer     Commissioner of Patents and Trademarks